Sept. 16, 1952 F. WALLER ET AL 2,610,544

APPARATUS FOR PROJECTING MATCHED MOSAIC PICTURE IMAGES

Filed Dec. 13, 1947 2 SHEETS—SHEET 1

INVENTORS
FRED WALLER
RICHARD C. BABISH
BY
Emery, Varney, Whittemore & Dix
ATTORNEYS

APPARATUS FOR PROJECTING MATCHED MOSAIC PICTURE IMAGES

Filed Dec. 13, 1947

INVENTORS
FRED WALLER
RICHARD C. BABISH
BY
Emery, Varney, Whittemore & Dix
ATTORNEYS Patented Sept. 16, 1952

2,610,544

UNITED STATES PATENT OFFICE 2,610,544

APPARATUS FOR PROJECTING MATCHED MOSAIC PICTURE IMAGES

Fred Waller and Richard C. Babish, Huntington, N. Y., assignors to The Vitarama Corporation, Huntington Station, N. Y., a corporation of New York Application December 13, 1947, Serial No. 791,494

5 Claims. (Cl. 88—24)

This invention relates to the matching of the edges of the separate projected pictures used in making up a larger mosaic picture.

It has been difficult to obtain mosaic pictures without visible lines or zones at the regions where the separate pictures come together. One reason has been that masks used are not of sufficiently high accuracy, they cannot be placed exactly in the film plane, and the effective edges of the masks are affected by wear and by the accumulation of dirt from the motion picture film.

If the masks are undersize, a black line appears where the pictures should come together; and masks that are over-size produce a bright line of approximately double the brightness of the adjacent picture area. Blurred images of the mask edges, caused by the fact that the masks are not in exact focus, generally produce overlapping areas in which the light does not add up to same light level as found in the adjacent picture areas with the result that the match line is actually composed of alternate light and dark bands.

It is an object of this invention to match the separate pictures of mosaic images by using overlapping picture areas that merge the separate pictures into one another with no perceptible match lines. In accordance with one feature of the invention the overlapping areas are correlated so as to add up to a substantially constant light level equal to that of the adjacent pictures. This constant light level is obtained by having the light of the margin of one picture decrease progressively in intensity while the overlapping margin of the other picture increases at a compensating rate. This result is preferably obtained by having a uniform gradation of the light in the overlapping margins of both pictures, but uniform gradation is not essential as long as the overlapping margins vary in intensity at complementary rates that add up to a constant total.

Another object of the invention is to provide a mask that will produce vignetted match lines with overlapping margins of the separate pictures of complementary intensity that produces a total light level equal to that of the adjacent picture areas. This result is obtained by optical wedges along the edges of the masks, or by other means for producing a controlled gradation of light intensity across an area of a screen.

Other objects, features and advantages of the invention will appear or be pointed out as the description proceeds.

Figures 1, 2, 3, 4:
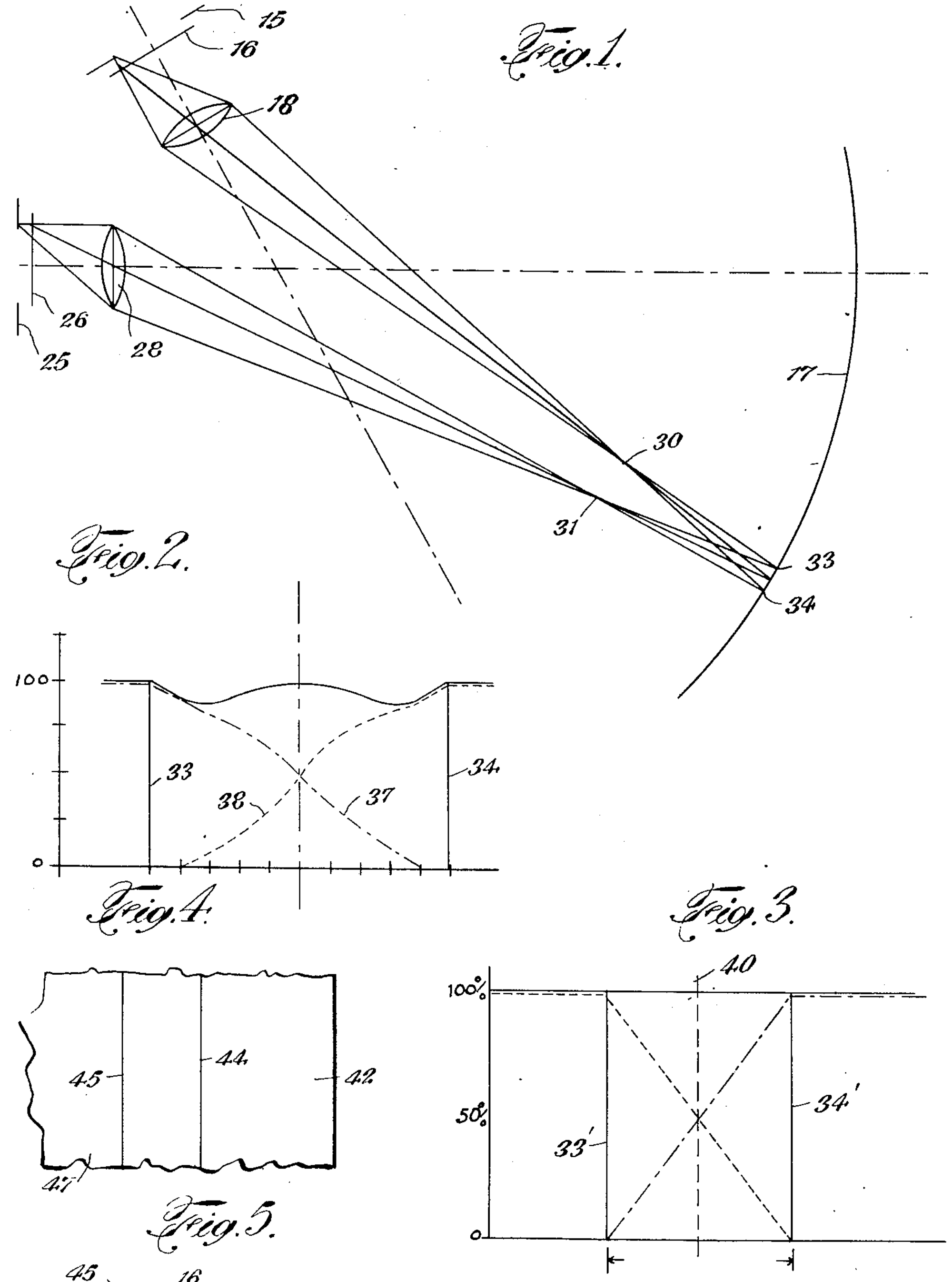
Figure 5:
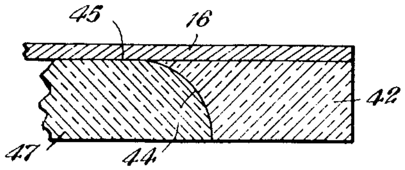
Figure 6:
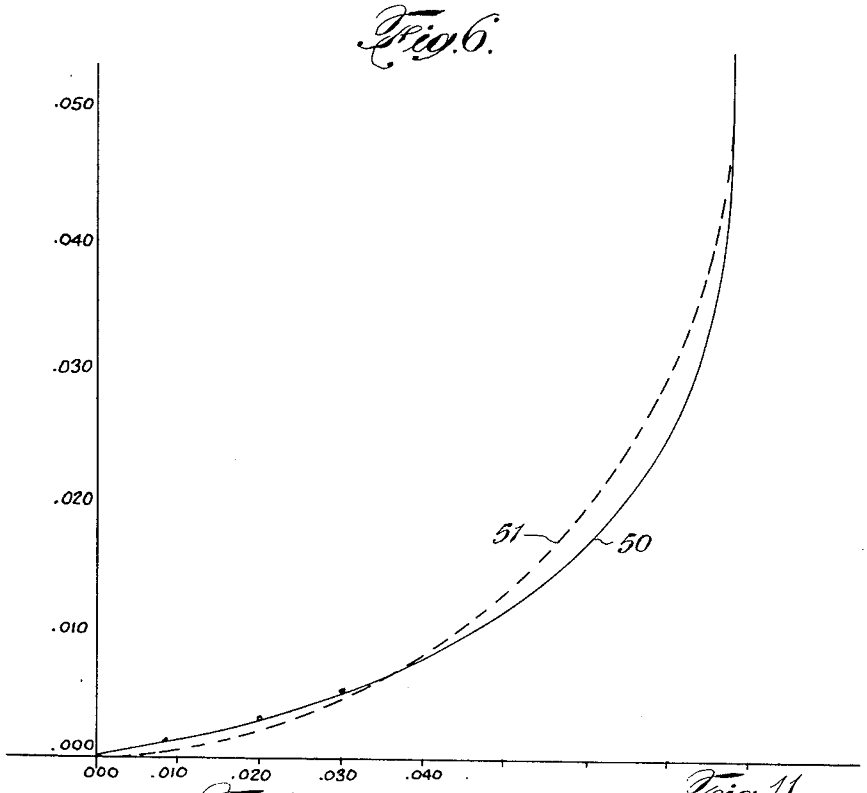
Figures 7, 8, 9, 10:
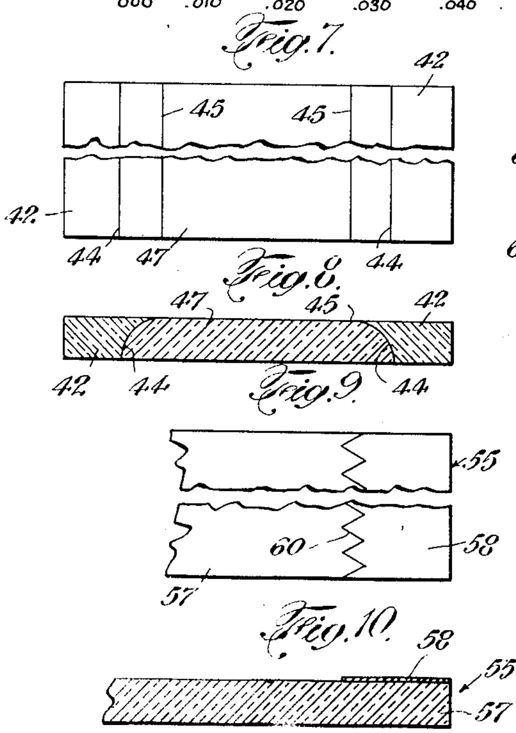
Figures 11, 12, 13:
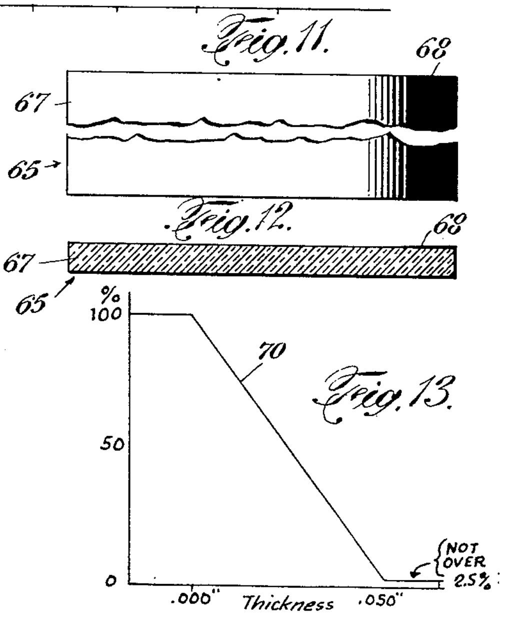

In the drawing forming a part hereof, in which like reference characters indicate corresponding parts in all the views, Figure 1 is a diagram illustrating the way in which images of masks are spread on a screen when making mosaic pictures, Figure 2 is a diagram showing the variation in light intensity across the overlapping areas of the blurred mask images of the prior art, Figure 3 is a diagram illustrating the gradation of light with the masks of this invention, Figure 4 is a fragmentary rear elevation of a mask embodying this invention, Figure 5 is a horizontal sectional view through the mask of Figure 4 with the mask in position adjacent a film, Figure 6 is a diagrammatic view illustrating the way in which the theoretical light wedge required for the gradation shown in Figure 3 can be closely approximated using an arc of a circle along the mask edge, Figure 7 is a rear view of a mask similar to that shown in Figures 4 and 5 but designed for use with a picture having other pictures at both sides of it in the mosaic, Figure 8 is a horizontal sectional view through the mask shown in Figure 7, Figure 9 is a fragmentary elevation showing a modified form of mask embodying this invention, Figure 10 is a horizontal sectional view through the mask shown in Figure 9, Figure 11 is a view similar to Figure 9 but showing a mask made in accordance with a second modified form of the invention, Figure 12 is a horizontal sectional view of the mask shown in Figure 11, Figure 13 is a diagrammatic view illustrating the gradation in transparency of the edges of the mask shown in Figures 4, 7 and 11.

Figure 1 shows a mask 15 located behind a film 16, the image of which is projected on a curved screen 17 through a lens 18. In another projector a mask 25 is used with a film 26, the image of which is projected on the screen 17 through a lens 28. The films 16 and 26 are preferably in contact with the front surfaces of the masks 15 and 25 respectively, but in the diagrammatic showing of Figure 1, the masks and films are spaced apart for clearer illustration. Because of the physical thickness of the masks however, it is not possible for them to be in the plane for which the lenses 18 and 28 are focused.

Since the masks are not in the same plane with the film, the position at which the edges of the masks 15 and 25 are focused will be ahead of, or behind, the surface of the screen 17, depending upon whether the masks are located behind or in front of the films. With the masks behind the films, as illustrated, an edge of the mask 15 is in focus at a region indicated by the reference character 30; and the adjacent edge of the mask 25 is in focus at a region 31. On the surface of the screen 17, the slightly blurred images of the masks are spread over a zone extending from a vertical line 33 to another vertical line 34. This zone of overlap contains alternating light and dark bands.

Figure 2 illustrates the reason for the alternating light and dark bands. Beyond the line 33 the full illumination on the screen, represented by the illumination valve 100% in the graph, is supplied through the projector 18. To the right of the line 33 the blurred image of mask 15 begins and the screen illumination from the projector 18 becomes progressively less as indicated by the line 37. Toward the edge of the picture projected by the projector 28 the screen illumination decreases beyond the line 34 in accordance with the illumination variation represented by the line 38.

The total screen illumination between the lines 33 and 34 at the region where the images of the mask edges overlap, is equal to the sum of the illuminations supplied by the overlapping edges of the individual contiguous pictures. Since the screen illumination supplied by the respective pictures is represented by the lines 37 and 38, and since the sum of the ordinates of the lines 37 and 38 is not constant, there is an uneven illumination of the screen between the lines 33 and 34. With the variations represented by the lines 37 and 38 a light band exists midway between the lines 33 and 34 whereas dark bands are visible in the immediate regions of these lines 33 and 34. These dark bands can be decreased by increasing the overlap of the marginal edges of the separate pictures, but this is undesirable because it increases the screen illumination midway between the lines 33 and 34 and makes the juncture of the separate pictures even more pronounced than with the illumination totals illustrated in Figure 2 where the light center band is substantially equal to the screen illumination of the pictures beyond their regions of overlap.

With this invention the marginal edges of the separate pictures are purposely overlapped and special masks are used which produce a gradation of illumination that is symmetrical about the line along which both of the projectors supply 50% of the light. The gradation of light from full screen illumination to the zero or minimum light transmitting portion of the mask will be referred to herein as the "transmission curve" of the mask edge.

Figure 3 shows illustrative transmission curves for attaining the results of this invention. In this figure the light from the right hand projector decreases from approximately 100% at a line 33' to zero at a line 34'. This variation is along a straight line symmetrical with respect to the center line 40 of the band along which the separate pictures overlap on the screen. This transmission curve is a straight line in Figure 3, but it will be evident that transmission curves of other shapes can be used as long as the sum of the transmission curves at all regions across the zone of overlap is substantially equal to the full screen illumination of the separate pictures adjacent the zone of overlap. In order to obtain the uniform light transmission gradation shown in Figure 3, a light wedge can be used along the edge of the mask.

Figures 4 and 5 show one form of light wedge. The construction illustrated in these figures includes a mask constructed of filter glass 42 having a sloping inner edge surface 44 that produces a decreasing thickness of the filter glass down to a feather edge 45. In order to prevent the accumulation of dirt along the edge of the mask and to protect the edge 45 from damage, a clear transparent glass filler 47 is fitted into the opening through the filter and shaped along its edge to contact with the surface 44. The filter glass 42 and clear glass 47 are preferably cemented together to make an integral unit.

The film 16 moves across the front surface of the mask unit and the light passing through the film decreases from a value of 100% to the left of the edge 45 down to substantially zero at the region where the filter glass 42 reaches its full thickness.

The correct curve for surface 44 can be computed from the known light transmitting quality of the filter glass 42, and will be different for different kinds of filter glass. The actual shape of this surface 44, as computed for Bausch & Lomb N-6 filter glass is indicated in Figure 6 by the line 50. This curve can be approximated by a cylindrical surface represented by the line 51. The cylindrical surface 51 produces a mask edge that transmits somewhat too much light at certain regions and not quite enough light at others. The variations of the transmission curve of the surface 51 from the theoretically perfect transmission curve that is obtained with the surface 50 is not sufficient to be noticeable in a projected picture, and this invention preferably uses cylindrical surfaces because of the greater convenience and better control in the grinding of such surfaces along glass edges.

Figures 7 and 8 show on a smaller scale a mask similar to that shown in Figures 4 and 5 but with light wedges along opposite edges of the mask. Such a double edged mask is used for a picture that will have other pictures overlapping it along both of its side edges. For those pictures of the mosaic which are located at one side of the screen, and which overlap another picture on only one side, it will be evident that a light wedge along only one margin of the mask is sufficient.

Figures 9 and 10 show a modified form of the invention in which a mask 55 is made of a clear transparent glass body 57 with an opaque shield 58 applied to the front surface of the body or embedded in the transparent body 57. This opaque shield has a scalloped or saw tooth edge with the depth of the scallops or saw teeth 60 corresponding to the zone of overlap of the film images. If the saw teeth 60 are sufficiently narrow and sufficiently out of focus on the screen, they produce a gradation of light that approximates the results shown in Figure 3. If the saw teeth 60 are made wider, or if more accurate gradation of the light is desired, this result can be obtained by oscillating the mask 55 up and down for a distance at least as great as the width of one of the teeth 60. When such oscillation is used, the movement of the mask is synchronized with that of the projector shutter so that the mask is in motion during times when the screen is illuminated, and the stopping and reversal of the motion of the mask is made to correspond with the periods when the picture film is moving and there is no illumination of the screen.

Figures 11 and 12 show another modified form of the invention in which a mask 65 is made of clear transparent glass 67 and is provided with light wedges along its masking edges by providing a thin metal film 68 on one surface of the glass. This metal film may be applied to the glass by evaporating the metal on the surface of the glass 67 in such a way as to produce a light transmission gradation that varies from 100% where the glass is completely clear to a zero transmission where the metal film becomes sufficiently thick and uniform to prevent the passage of any light. The application of the metal film to the glass 67 can be made with the mask traveling at a suitable variable velocity in an evaporation chamber used for making the mask 65.

Figure 13 shows a transmission curve 70 for the masks shown in Figures 4, 5, 7 and 8. This figure is similar to one side of Figure 3 in that the transmission curve is a straight line, but it differs from Figure 3 in that the transmission curve never reaches zero. The filter glass of the thickness used for the masks permits the passage of some light even at its regions of maximum thickness. Experience has shown, however, that the transmission of light, the brightness of which does not amount to more than about 2.5% of the full screen illumination, is not perceptible. There is, therefore, no justification for using filter glass of a thickness that will reduce the light transmission below this value, or in applying completely opaque frames to those portions of the filter glass masks beyond the sloping surfaces where the thickness of the glass varies progressively.

With this invention it is not necessary to match the edges of the separate pictures of a mosaic with accuracy, and yet completely invisible matches of separate pictures are obtained. Variations and modifications other than those illustrated can be made, and some features of the invention can be used alone or in different combinations without departing from the invention as defined in the claims.

We claim as our invention:

1. Apparatus for making mosaic pictures, said apparatus comprising two separate projectors for projecting images of separate film frames upon the screen, a mask associated with the film of each projector, and each mask having a light-transmitting edge zone along the side of the image that must match a side of the image of the other picture of the mosaic, said light-transmitting edge zone being of progressively less transparency at points spaced inward from the edge of the mask, and said projectors being in positions that locate the images on the screen with the images overlapping for a distance not greater than the width of the images of the light-transmitting edge zones of the respective masks.

2. Apparatus for making mosaic pictures including a plurality of separate projectors for projecting images of film frames on a screen, a separate mask for each projector in position to limit the field of illumination of the screen by that projector, each of said masks having an edge zone that transmits light over a predetermined portion of the mask beyond the masking edge, each of said projectors being correlated with another of said projectors so as to project an image in position to overlap the adjoining image from the other projector for a distance substantially equal to the width of the projected image of the light-transmitting portions of said edge zones of the masks.

3. The apparatus described in claim 2 with the light-transmitting portion of each mask correlated with the light-transmitting portion of the other mask to produce a total illumination that is uniform and equal to the full illumination of the adjacent picture images across the portion of the screen on which the images of said masks overlap.

4. Apparatus for projecting mosaic pictures including two projectors in position to project images that overlap on a screen, a mask associated with each projector in the portion of a light beam that produces the overlapping part of the image from the projector, each of said masks having a masking edge and a light-transmitting edge portion adjacent the masking edge constructed of material that transmits progressively less light in a direction away from said edge and with the variation in the intensity of the transmitted light symmetrical about a line located substantially midway across the light transmitting edge portion of said mask.

5. Apparatus for projecting mosaic pictures including two projectors in position to project images that overlap on a screen, a mask associated with each projector in the portion of a light beam that produces the overlapping part of the image from the projector, the mask of one projector having a right-hand masking edge and a mask portion adjacent said masking edge constructed and arranged to transmit light but having its light-transmitting quality progressively less in a direction away from said masking edge, and the other of said masks having a left-hand masking edge and a mask portion adjacent the masking edge with light-transmitting qualities that decrease away from the masking edge at a rate that is correlated with the light-transmitting qualities of the first mask to produce a constant total of light over the area of the screen on which the images from both projectors overlap.

FRED WALLER.
RICHARD C. BABISH.

REFERENCES CITED

The following references are of record in the file of this patent:

UNITED STATES PATENTS

| Number | Name | Date |
|---|---|---|
| 970,111 | Ramstein | Sept. 13, 1910 |
| 1,230,188 | McCormick | June 19, 1917 |
| 1,349,580 | Paradis | Aug. 17, 1920 |
| 1,805,969 | Bostrom | May 19, 1931 |
| 1,808,352 | Hollen | June 2, 1931 |
| 1,940,004 | Mayhugh | Dec. 19, 1933 |
| 1,942,748 | Ybarrondo | Jan. 9, 1934 |
| 1,945,926 | Tolhurst | Feb. 6, 1934 |
| 2,163,029 | Gage | June 20, 1939 |
| 2,331,027 | Harrison | Oct. 5, 1943 |
| 2,405,444 | Moreau et al. | Aug. 6, 1946 |

FOREIGN PATENTS

| Number | Country | Date |
|---|---|---|
| 298,615 | Great Britain | Jan. 13, 1930 |
| 2,703 | Australia | June 22, 1931 |